Nov. 3, 1925. Re. 16,196

J. BATH

GRINDING MACHINE

Original Filed June 5, 1912 9 Sheets-Sheet 1

Nov. 3, 1925. Re. 16,196

J. BATH

GRINDING MACHINE

Original Filed June 5, 1912 9 Sheets-Sheet 2

Inventor
John Bath
By Attorneys
Southgate Fraser Hawley

Witness
E. F. Meier

Nov. 3, 1925. Re. 16,196

J. BATH

GRINDING MACHINE

Original Filed June 5, 1912 9 Sheets-Sheet 3

Inventor

John Bath

By Southgate Fay & Hawley Attorneys

Witness
E. F. Mean

Nov. 3, 1925. Re. 16,196

J. BATH

GRINDING MACHINE

Original Filed June 5, 1912 9 Sheets-Sheet 4

Inventor
John Bath.
By attorneys
Southgate Fay & Hawley

Witness
E. F. Mason.

Nov. 3, 1925. Re. 16,196
J. BATH
GRINDING MACHINE
Original Filed June 5, 1912 9 Sheets-Sheet 5
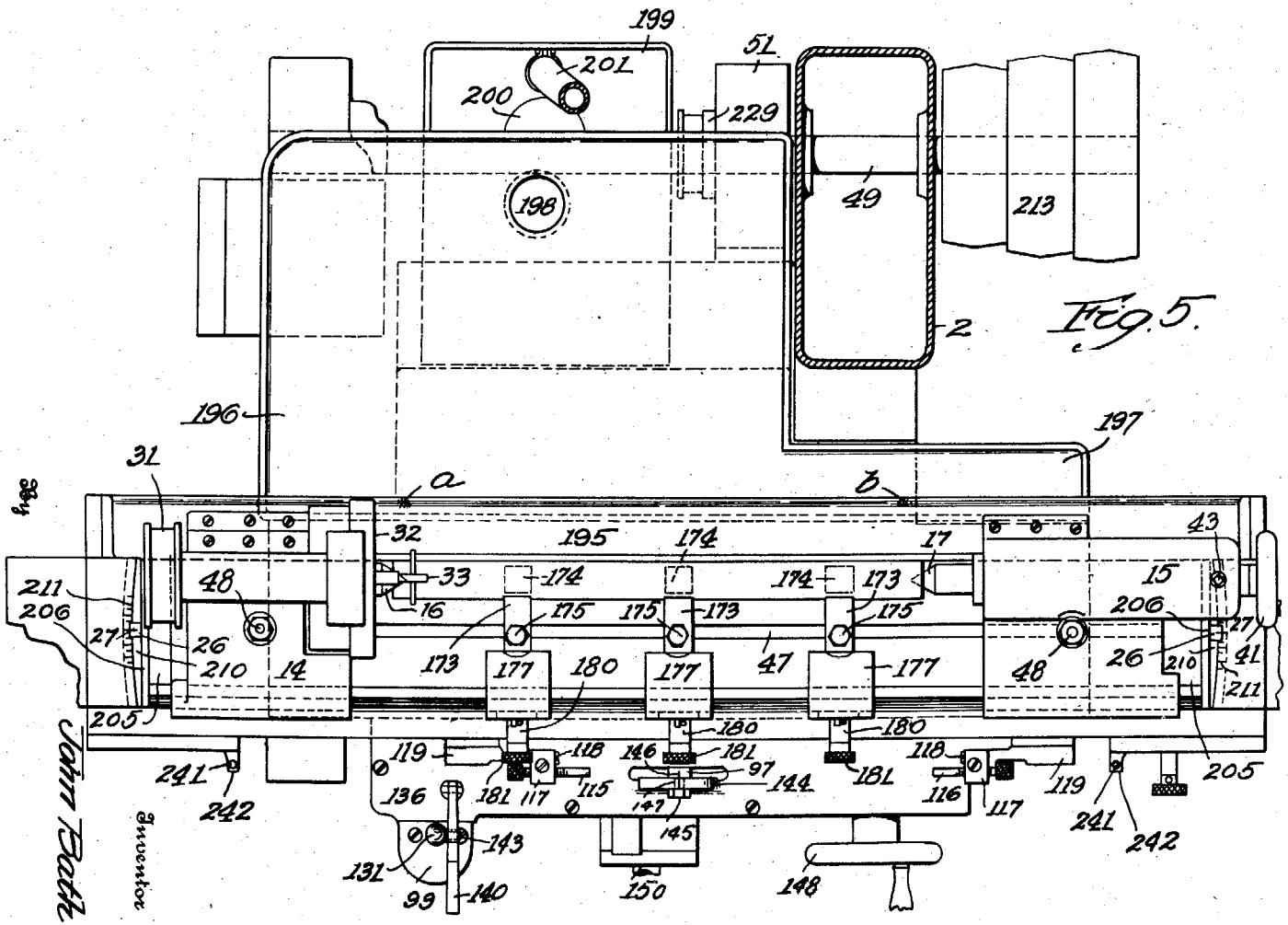
Inventor
John Bath
By
Southgate Kay & Hawley Attorneys
Witness
B. F. Nissen Nov. 3, 1925.
Re. 16,196
J. BATH
GRINDING MACHINE
Original Filed June 5, 1912 9 Sheets-Sheet 6
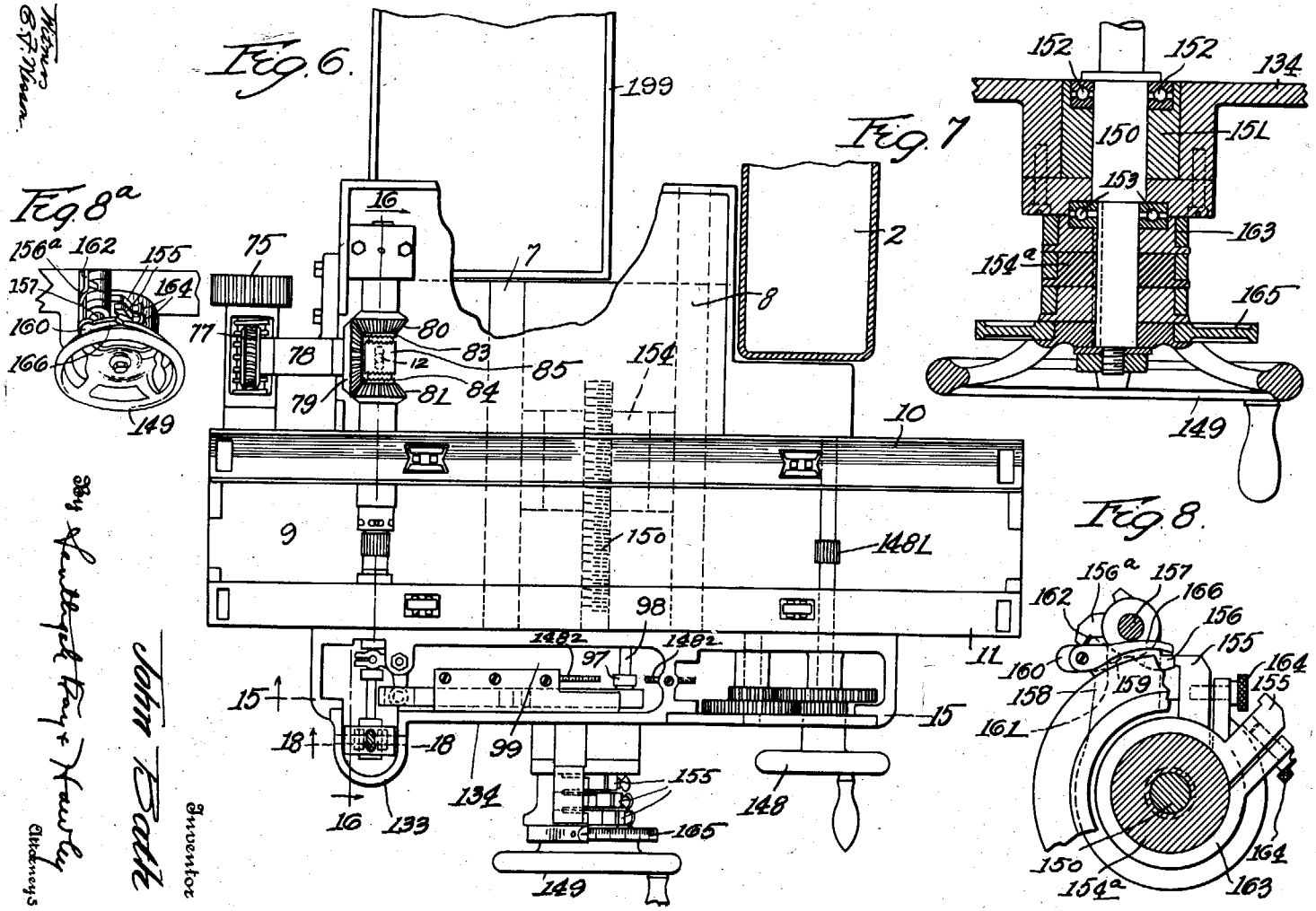
Inventor
John Bath
By Fenwick Kay & Hawley
Attorneys
Witness
B. F. Wesson Nov. 3, 1925. Re. 16,196
J. BATH
GRINDING MACHINE
Original Filed June 5, 1912 9 Sheets-Sheet 7
Fig. 13
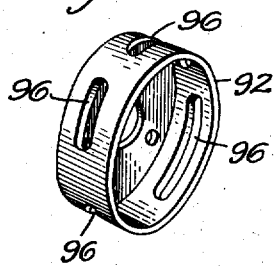
Fig. 9.
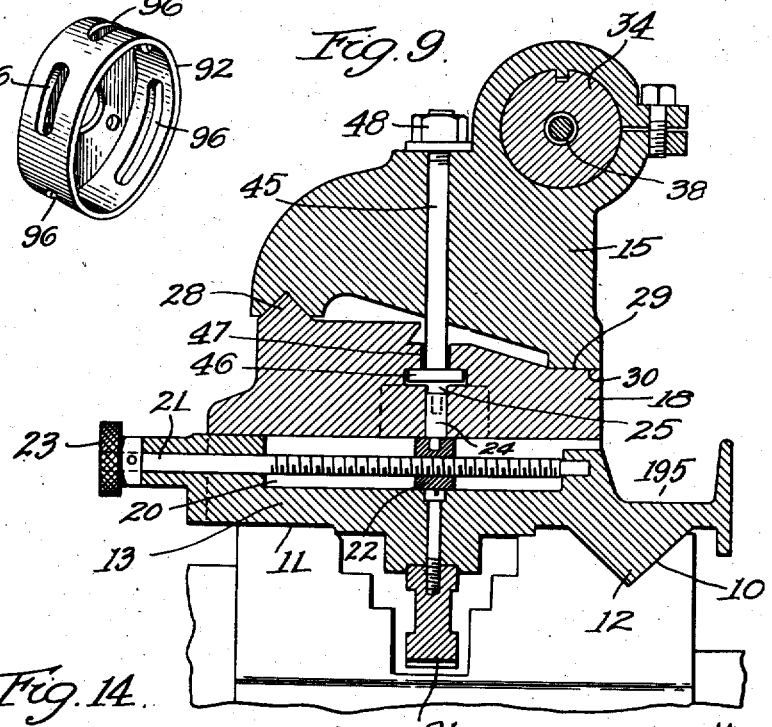
Fig. 14.
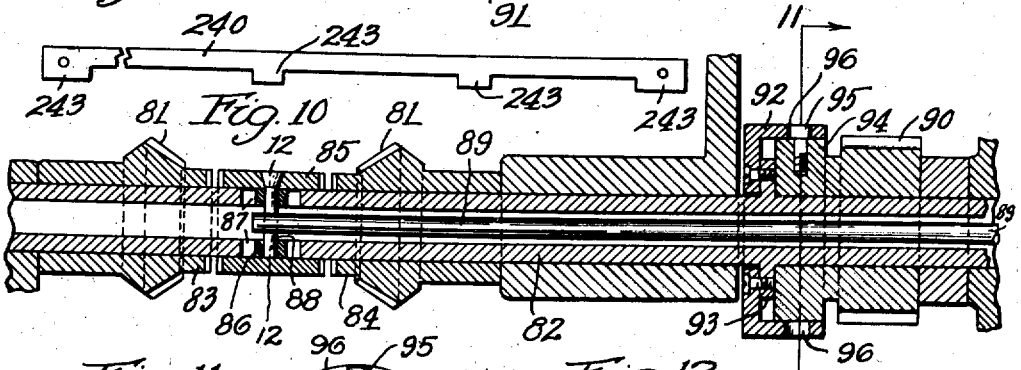
Fig. 10
Fig. 11.
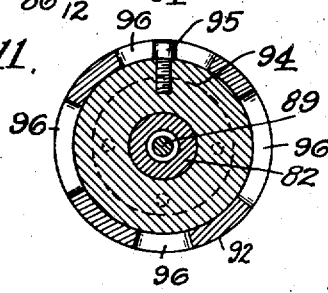
Fig. 12.
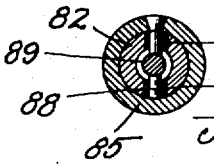
Inventor
John Bath
By Southgate Hay & Hawley
Attorneys
Witness
C. F. Nixon Nov. 3, 1925. Re. 16,196
J. BATH
GRINDING MACHINE
Original Filed June 5, 1912 9 Sheets-Sheet 8
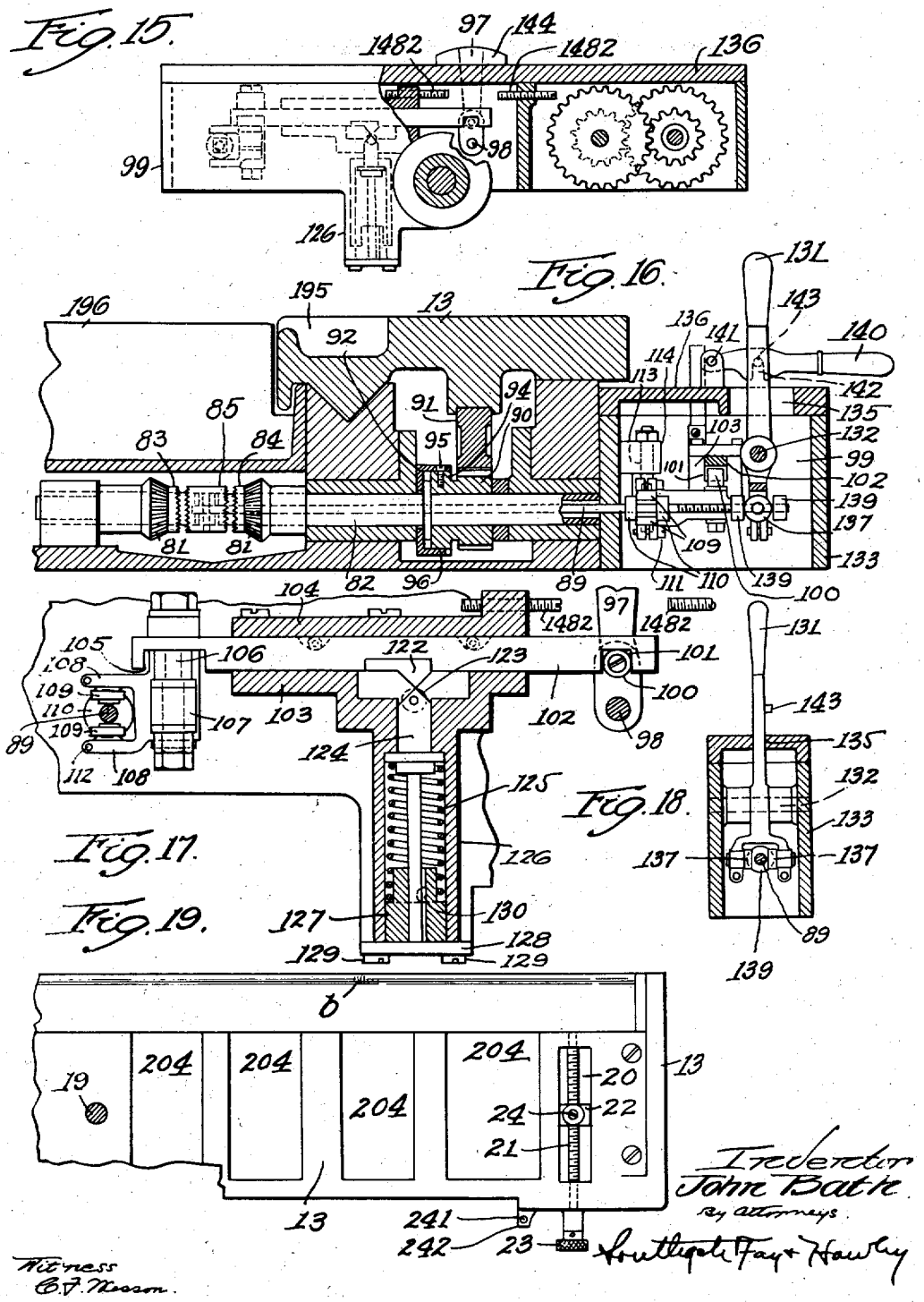
Inventor
John Bath
By attorneys
Routzahn Fay & Hawley
Witness
C. F. Nesson Nov. 3, 1925. Re. 16,196

J. BATH

GRINDING MACHINE

Original Filed June 5, 1912 9 Sheets-Sheet 9

Inventor
John Bath
by attorneys,
Southgate Fay & Hawley

Witness
B. F. Mason

Reissued Nov. 3, 1925.

Re. 16,196

UNITED STATES PATENT OFFICE.

JOHN BATH, OF WORCESTER, MASSACHUSETTS, ASSIGNOR TO JOHN BATH & COMPANY, INCORPORATED, OF WORCESTER, MASSACHUSETTS, A CORPORATION OF MASSACHUSETTS.

GRINDING MACHINE.

Original No. 1,202,018, dated October 24, 1916, Serial No. 701,754, filed June 5, 1912. Application for reissue filed May 25, 1925. Serial No. 32,854.

*To all whom it may concern:*

Be it known that I, JOHN BATH, a citizen of the United States, residing at Worcester, county of Worcester, State of Massachusetts, have invented a new and useful Grinding Machine, of which the following is a specification.

This invention relates to grinding machinery, particularly to machines of that class designed to grind external surfaces of revolution.

The object of the invention is to produce a machine for this purpose having certain improvements and refinements hereinafter fully explained and claimed, by which to obtain more accurate results than heretofore in certain particulars, and to carry out the operations on the work piece in a more efficient and a better manner.

In the drawings accompanying this application, I have illustrated a form of the machine in which the principles of my invention are embodied, the same containing the preferred form, though not necessarily the only one, of this invention.

In these drawings, Figure 1 is a front elevation of the machine referred to.

Fig. 5 is a plan view, the grinding wheel being removed and the grinding wheel post or support being shown in horizontal section.

Fig. 6 is a plan view of the cross feed slide of the machine and the mechanism for operating the moving parts, the work-carrying slide being removed, and part of the base of the machine being shown in plan.

Fig. 7 is a sectional view of the cross feed operating mechanism.

Fig. 8 is a front elevation of the same.

Fig. 8[a] is a perspective view of the same mechanism.

Figure 1:
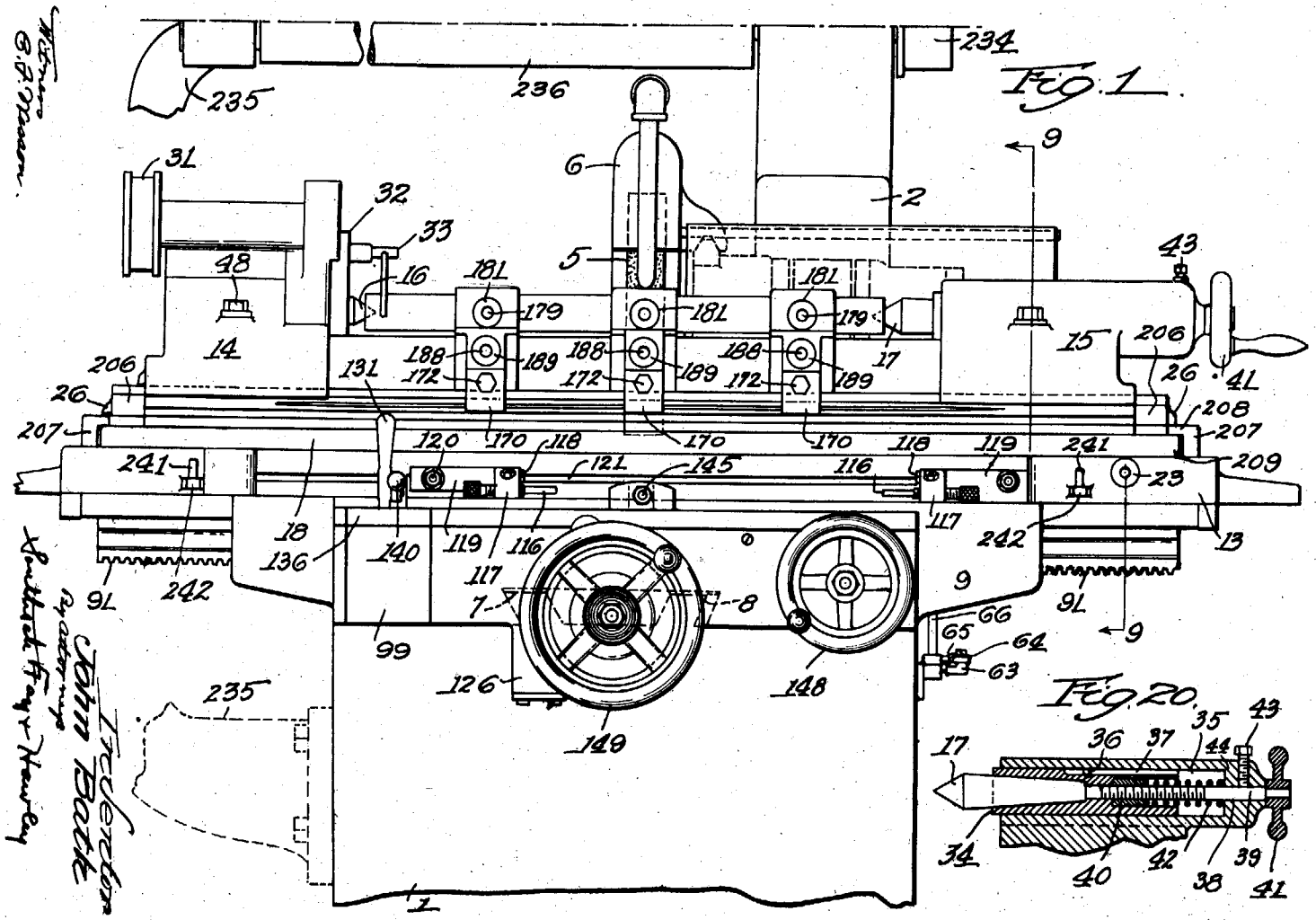

Fig. 9 is a cross section of the foot stock and sliding swivel table on line 9—9 of Fig. 1.

Fig. 10 is a longitudinal section enlarged of the mechanism for reciprocating the swivel table.

Fig. 11 is a cross section on line 11—11 of Fig. 10.

Fig. 12 is a cross section on line 12—12 of Fig. 10.

Fig. 13 is a perspective view of a cylindrical shell forming part of the mechanism shown in Fig. 10.

Fig. 14 is a plan view of a templet or dogging element.

Fig. 15 is an elevation partly in section on line 15—15 of Fig. 6.

Fig. 16 is a cross section on line 16—16 of Fig. 6.

Fig. 17 is an enlargement of the parts shown in Fig. 15.

Fig. 18 is a cross section on line 18—18 of Fig. 6.

Fig. 19 is a plan view of a part of the slide showing the means of adjusting the swivel table and means for carrying away the water.

Fig. 20 is a longitudinal section of the foot stock showing the means for adjusting the dead center.

Figure 21:
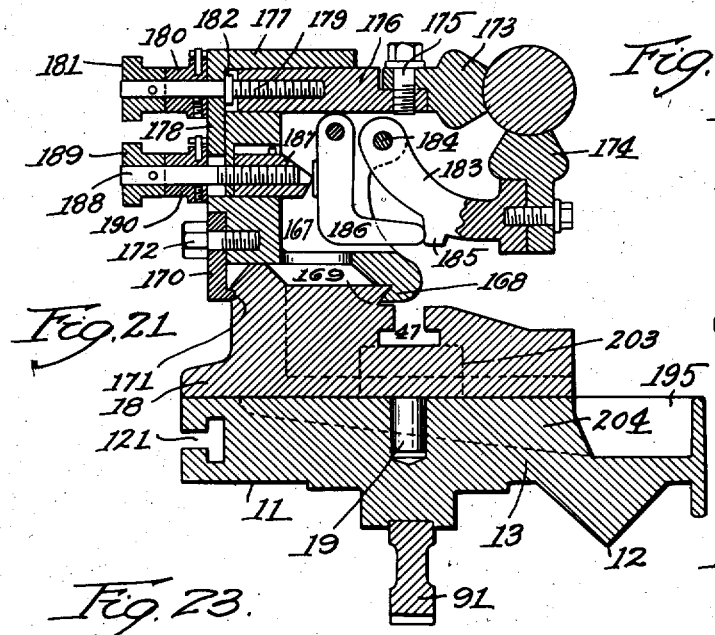

Fig. 21 is a cross section on a larger scale of one of the intermediate work rests.

Figure 22:
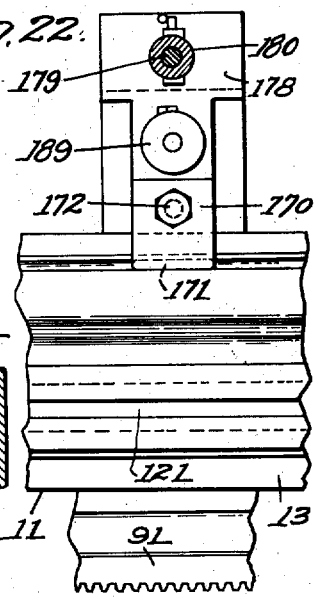

Fig. 22 is a front elevation of the same.

Figure 23:
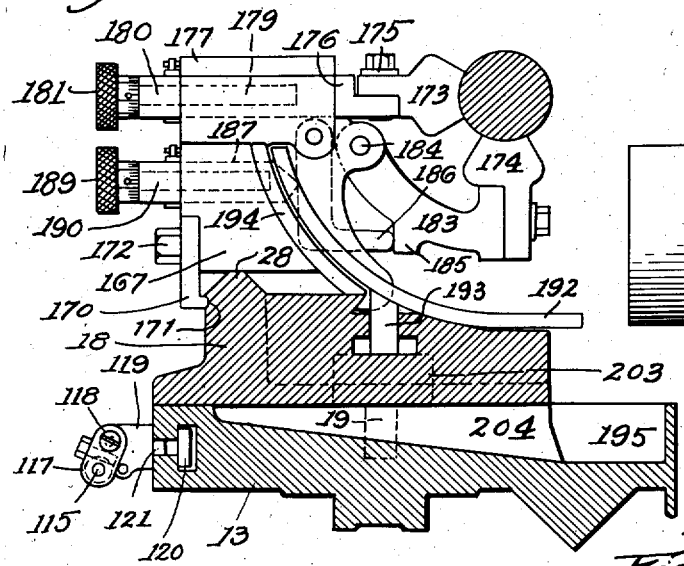

Fig. 23 is a side elevation of the same.

Figure 24:
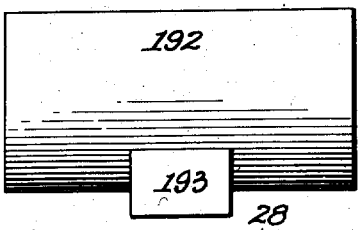

Fig. 24 is a rear elevation of one of the water shields.

Figure 25:
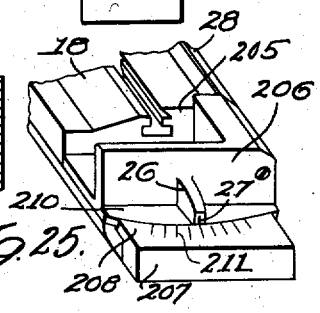

Fig. 25 is a perspective view of one end of the swivel table showing the means which I have devised for disposing of the water.

Like reference characters indicate the same parts in all the figures.

I will first describe the constructions illustrated in the drawings and then explain the principle embodied in such constructions and the advantages thereof.

First referring to the general views, Figs. 1 to 6 inclusive, the base of the machine is seen to be a box like structure 1, L-shaped in plan of which the L or rearwardly extending part 2 rises somewhat above the main portion as a hollow column and supports a bracket 3 carrying the bearings 4 in which are mounted the spindle of the grinding wheel 5. Such grinding wheel is partly covered and guarded by the case 6 secured to the bracket 3 and partially surrounding the wheel. The forward part of the machine has transversely extending guide ways 7 and 8 (Fig. 1,) on which is mounted a cross feed carriage 9. The latter has longitudinal guide ways 10 and 11 (Fig. 9) extending perpendicularly of the cross feed guide ways, and termed "longitudinal" because they extend in the direction in which the work is carried back and forth across the grinding wheel. The guide way 10 is V-shaped and the guide way 11 is flat, the former receiving a downwardly projecting V-shaped rib 12 on the under side of a longitudinal reciprocating slide 13 and the latter contacting with a flat portion of the under side of the slide. Such slide may also be termed a "bed" or a "work carrier," since its function is to carry the head stock 14 (Fig. 1) and the foot stock 15 having, respectively, the live center 16 and the dead center 17 engaged with the ends of the work. Both the head and foot stocks are adjustably mounted on a swivel table 18 pivotally connected at its center with the slide 13, by means of a pivot stud 19 shown in Fig. 19. The slide 13 contains a channel 20 in which is held a screw 21 rotatable but otherwise immovable, passing through a nut 22 and having a head 23 at the front of the slide for manual actuation. The nut is adapted to travel along the channel 20 and carries a stud or roll 24 contained in a notch 25 in one end of the swivel table (Fig. 9). Rotation of the screw swings the swivel table in a manner which will be readily understood, to enable tapered work pieces to be ground. One or both ends of the swivel table has a projection 26 (Figs. 5 and 25) bearing the index mark 27 which in conjunction with a graduated scale on the adjacent part of the slide or bed shows the amount of deviation of the axis of the work from the line of travel.

The head and foot stocks are in the main of conventional design, each having a groove to receive an upstanding V-shaped rib 28 extending the length of the swivel table, shown in Fig. 9, and having also a bearing surface 29 adapted to rest on a complemental plane surface 30 extending along the swivel table at the opposite edge thereof from the rib. The head stock has rotatably mounted upon it a pulley 31 (Fig. 2) which drives, through gearing not shown, a spindle carrying the face plate 32 and the live center 16. Such face plate also carries a pin or dog 33 as usual for rotating the work.

A cross section of the foot stock is shown in Fig. 9 and a longitudinal section thereof in Fig. 20 (Sheet 1). The center 17 is secured, in the usual manner, in a tube or quill 34 which slides longitudinally in a socket 35 and is prevented from rotating by a key or tongue 36 entering a groove 37. An adjusting screw 38 has a bearing at 39 at one end of the foot stock and engages a nut 40 secured in the quill. It is rotated in the usual manner by a hand wheel 41. A novel feature of the foot stock is that the screw is not held against endwise movement in both directions. The means which normally holds the dead center up to the work is a spring 42 which thus takes the thrust of the work yieldingly rather than positively, and thereby insures against too great friction between the work and dead center. A means, however, is provided for preventing the outward movement of the screw 38, that is, to the right with respect to Figs. 1 and 20. This means is a set screw 43 which is so arranged as to be capable of compressing a washer or plug 44 of lead against the shank of the screw and thereby holding the same with any desired degree of friction. The foot stock is secured in any position of adjustment on the swivel table by means of a bolt 45 (Fig. 9) having a head 46 contained in a T slot or under cut groove 47 extending longitudinally of the table, such bolt being tightened by a nut 48 as shown clearly in Fig. 9. A similar means of which only the nut 48 is shown in the drawings is used for clamping the head stock.

The motor mechanism by which the slide is reciprocated to carry the work back and forth past the grinding wheel consists of the following. A drive shaft 49 (Fig. 2) is driven by a belt 50 passing around a pulley 51 on such shaft. Said shaft carries a bevel gear 52 which meshes with a gear 53 on the side of a friction disk 54. This disk rotates about a stationary shaft 55 suitably supported by brackets on one end of the machine's base. Also rotatably mounted on the same shaft are a friction disk 56, (Fig. 3) and a toothed drum or gear 57 which are rigidly connected together. The disks 54, 56 are somewhat separated and on their adjacent faces are annular concave grooves in which are contained wheels or rolls 58 making contact with both disks for transmitting motion from one to the other. These rolls are adapted to oscillate about axes perpendicular to their own axes and also to the axes of the disks, whereby their points of contact with the disks may be shifted, respectively, toward the center of one disk and toward the periphery of the other disk at the same time, whereby to vary the speed of the disk 56, 54 being driven at a uniform rate. This particular driving mechanism is not my invention but is described in a patent issued to Henry H. Cummings, therefore I do not explain it in particular detail. A feature of this mechanism, which is, however, novel with me is that the shaft 55 is fixed and stationary while the disks and the gear 57 rotate around it, the oscillating and rotating rolls 58 being pivotally supported upon brackets secured to the shaft. This condition enables the ball thrust bearing of the disk 54 to be taken up by lock nuts 59 screwed upon the shaft, while a ball thrust bearing at the opposite end of the drum 57 is kept under tension by a spring bearing against an adjustable collar or nut on the shaft. There are two rolls 58 arranged on respectively opposite sides of the shaft 55, and to one of them is connected an upright shaft 60 (Fig. 3) by which the described oscillative movement is given. The other roll is operated by said shaft through gear segments whereby the two rolls are equally and oppositely shifted. On the shaft 60 there is connected an arm 61 having a pivot coupling with a link 62 which passes from one side of the base to the other and at its other end (see Fig. 4) carries a collar 63 connected pivotally by a short link 64 with an arm 65 on an operating shaft 66. The latter runs upward beside the base to the top of the bracket 3, where it passes through a plate 67 and carries a handle 68 pivoted to it at 69 above said plate. The handle may be turned in one direction or the other to shift the speed rolls through the connections described, and is retained in any position by a latch pin 70 carried upon a rearwardly projecting arm 71 and adapted to be set into any one of a number of holes in the disk 67.

Gear 57 (Fig. 3) is longer than the amount of travel of the cross feed carriage 9 and extends in the direction of this travel. It meshes with the first of a train of gears 72, 73, 74, and 75, carried by an arm 76 which is secured to the cross feed carriage 9. Gear 72 may slide along, while remaining in mesh with the long gear or drum 57, and thus driving of the longitudinal work feed (by the mechanism presently to be described) is made possible in all positions, of the carriage 9. The last gear 75 of the train is on the shaft of a worm 76 which meshes with a worm wheel 77. The latter is on a shaft which passes through a transverse bearing 78 (see Fig. 6) and carries a bevel gear 79 meshing with complemental bevel gears 80 and 81. The latter are pivoted loosely upon a tubular shaft 82, for illustration of which reference may be had to Figs. 10 and 16, and therefore turn in respectively opposite directions when the driving mechanism is in operation. These gears 80 and 81 carry clutch members 83 and 84, respectively, on their ends nearest to one another, and between these clutch elements is a double clutch sleeve 85 having teeth on both ends slidingly mounted on the tubular shaft and prevented from rotating relatively thereto by means of rolls 86 contained in slots 87 in opposite sides of the shaft and mounted upon a pin 88 which passes through the clutch sleeve and also through a rod 89 contained within the tubular shaft. Such rod by being moved endwise connects the double clutch 85 with either the clutch element 83 or the clutch 84. Thus either gear 80 or 81 may drive the tubular shaft. The motion of this shaft is transmitted to the slide 13 by means of a pinion 90 driven by the shaft and connecting with a rack 91 (Fig. 16) on the under side of the slide. Said pinion 90 is loose on the tubular shaft but is connected thereto with provision for a certain amount of rotative lost motion by means of a cylindrical shell 92 (Fig. 10) secured to a flange 93 on the shaft and surrounding the hub 94 of the gear. Said hub carries a stud 95 contained in a slot 96 of the shell 92. The reversals of the shaft and shell 92 cause the pinion to drive the slide back and forth and at each reversal the lost motion allows the slide to remain stationary for a period before it too returns. This pause is designed to be long enough to allow the work piece to make one complete rotation while the grinding wheel is at the end of the part upon which it is acting. This is a valuable feature as it enables the extreme ends of the work to be ground true and thus adds greatly to the accuracy of the machine. The amount of lost motion may be varied to accommodate work pieces of different circumferential extents and to this end the shell 92 has several slots 96 of varying lengths into any one of which the stud 95 may be set, this stud being detachable for the purpose substantially as shown.

The rod 89 which shifts the clutch 85 may be operated first in one direction and then in the other either automatically or by hand. The automatic mechanism includes a lever 97 (see Figs. 6, 15, and 17) pivoted upon a shaft 98 in a box 99 on the front of the cross feed slide. This lever carries a roll 100 (Fig. 17) contained in a notch 101 in a bar 102 which is adapted to slide endwise in a guide 103 formed within the box having a removable cover 104. The bar 102 is also provided with another notch 105 in which is contained a roll 106 on one arm of a bell crank lever 107 the other arm of which is forked and has two prongs 108 straddling the rod 89 and carrying rolls 109 contained between collars 110 on said rod. The rolls 109 are journaled upon studs 111 which are contained in sockets within the prongs 108, such sockets being split at one side and being closed upon the studs by clamp screws 112.

A novel feature of this mechanism consists in the mode in which the bell crank 107 is mounted, it being swiveled upon a stud 113 (Fig. 16) hanging from a bracket 114 at the rear side of the box 99. When the lever 97 is oscillated from one side to the other, the mechanism last described produces a corresponding endwise movement of the rod 89, thereby shifting the clutch 85. The slide 13 carries dogs for thus shifting lever 97, such dogs being shown at 115 and 116 (Fig. 1) and being conveniently pins screwed through holders 117 which are hung by pivot screws 118 (Fig. 23) to blocks 119 adjustably secured by clamp bolts 120 having heads entering an undercut longitudinal groove 121 in the forward edge of the slide. Then in their normal position the dogs travel in a path which contains the lever 97 and they are thus enabled to strike and swing said lever in one direction or the other according as the slide is traveling. When the bar 102 is thus moved by this swing of the lever a V-shaped projection 122 (Fig. 17) on its under side travels over a roll 123 carried by a plunger 124, depressing such plunger against the resistance of a spring 125. When the point of the projection passes over the roll the spring causes pressure to be applied to an inclined side of the projection causing the bar 102 to complete its movement. I term this projection a "V-faced cam" on account of the function which it performs as described. Connection of the reversing clutch after disconnection of the clutch which was previously acting is insured by this V-cam in connection with a certain amount of lost motion provided between the walls of the notch 105 and the roll 106. The travel of the bar 105 is greater than the total throw of the clutch 85 and the longitudinal extent of one face of the V-cam is about equal to this throw, while the lost motion is approximately the same amount. Hence the disconnection of the previously acting clutch is not completed until the point of the V-cam passes the center. Hence even though the slide should stop at this point, the plunger acting on the side of the V will continue the movement of the clutch 85 until the same is coupled with the reverse driving gear. At the conclusion of this movement of the bar in either direction the excess space in the notch 105 is entirely on that side of the roll 106 which is to be acted upon on the next throw of the bar. A novel feature is provided in connection with the mounting of the plunger 124. (Fig. 17.) The same is contained in a sleeve 126 projecting from the bottom of the box 99. It passes through a plug 127 having a flange 128 overlapping the end of the sleeve 126 and held in place by screws 129. The shank of the plunger carries a key 130 contained in a groove in the plug to prevent the plunger from turning and thereby to keep the face of the roll 123 square with the V cam.

The means for manually operating the clutch consists of a lever 131 (Figs. 16 and 18) pivoted to a pin 132 contained in an offset 133 of the detachable front wall or cover 134 (Fig. 6) of the box 99 containing the reverse mechanism. Said lever passes through a slot 135 (Fig. 16) in the cover 136 of this box and has a handle on its outer end. On its lower end beneath the pivot is a fork embracing the rod 89 and carrying rolls 137 similar to the rolls 109, previously described, and similarly mounted and arranged on opposite sides of the rod 89 between collars 139 thereon. The portion of the rod 89 which carries the collars 110 and 139 is threaded whereby said collars, which are made as nuts fitted into the threads of the rod, may be adjusted. The collars are split and are provided with clamp screws by which they may be set immovably in their respective positions. By so adjusting the collars, the levers 97 and 131 may be brought into certain desired positions when the clutch 85 is in the neutral position. A novel device for automatically arresting the clutch in neutral position and so stopping the travel of the slide is provided in a latch 140 (Fig. 16) pivoted to a bracket 141 on the cover 136. This latch has a notch 142 adapted to receive a pin 143 on the side of the lever 131. In the construction shown, the notch is formed between two lugs on the under side of the latch lever, and the outer faces of such lugs are cam shaped so that the pin will pass under them and displace the lever until the notch is reached. Ordinarily the latch lever is thrown back out of the way, but when the operator desires to stop the machine at the end of the next cut, he swings it down allowing it to rest on the pin 143. On the next reversal of the clutch mechanism when the lever 131 has reached the position where the notch may receive the pin such lever is locked and the clutch is held in neutral position. A valuable feature of this device is that the latch is gravity operated to stop the trip motion and needs no springs for the purpose.

The dog-operated trip 97 passes through a slot in the box cover 136 (Fig. 5) and lies back of a rib 144 projecting upward from the cover beside such slot. This rib rises to the height of the end of the trip lever and extends beyond each limit of movement thereof. It is provided for the triple purpose of concealing the lever, of clamping the same, and of serving in conjunction therewith as an index or gage for shoulder work when the slide is operated by hand. The manner in which it accomplishes the first purpose is obvious. The second purpose is accomplished by a screw 145 shown in Fig. 1 which passes through the rib or shield and is adapted to clamp the lever when the latter is in or near mid position. An index is provided by marks 146 and 147 (Fig. 5) on the lever and rib, respectively, which register when the lever is in mid position. When so placed and secured by the clamp screw 145 the lever is in position to act as a gage and to arrest the movement of the slide when the same is operated by hand through the hand wheel 148 and the pinion 1481 (Fig. 6) meshing with the rack 91.

When the work to be ground is shouldered and the dogs 115 and 116 have been set to correspond with these shoulders, they coact with the lever 97 to stop the motion when the shoulder has been fed up to the grinding wheel. Stop screws 1482 (Fig. 15) are provided on both sides of the lever 97 to limit the throw thereof within the extremities of the shield 144 and are adjustable to secure this end with exactness. They are placed at a low point relatively to the pivot of the lever so that the noise occasioned by the lever striking them will be deadened as much as possible.

The cross feed by means of which the work is caused to approach and recede from the grinding wheel is accomplished by a hand wheel 149 (Figs. 6 and 7) secured upon a cross screw 150 which is held in a flange bearing 151 between the two ball thrust bearings 152, 153 held in the front wall of the box 99. The cross screw is threaded through a nut 154 clamped to the top of the base 1. Between the hand wheel and the bearing 153 I have mounted on the cross screw a number of collars 154[a], as many as desired independently keyed on the screw, each of which forms a bearing for a stop finger 155 (Fig. 8) independent of one another. Each stop finger cooperates with a stop pawl 156 mounted pivotally upon a stud 157 projecting from a wing 158 which rises from the flange of the bearing 151. Each of the stop pawls is adapted to swing out of the way of the corresponding finger, but when in the path of the finger it is held rigidly by a projecting lug 159 which rests against a stem 160 projecting from the arm 158 and having a face 161. When swung out of the way, the stop pawl is supported by a V shoulder 162 in the position illustrated by the pawl 156[a] in Fig. 8. As many of the cooperating stop fingers and pawls can be provided as may be desired. They serve to arrest the cross feed at various points in duplicating pieces having a number of diameters to be ground to given sizes or for varying diameters of roughing and finishing cuts. The fingers may be adjusted into any angular position to suit the work and to this end each is mounted upon a ring 163 which surrounds one of the collars 154[a] and is adapted to be tightened thereon by a clamp screw 164. After the finger which is most advanced has served its purpose, the cooperating stop pawl is swung out of the way, leaving the next one ready to do its work. Secured to the hub of the hand wheel is a disk 165 (Fig. 6) having a graduated scale on its periphery near which lies a finger 166 (Fig. 8) on the end of the stem 160. This scale and index in cooperation serve to denote the amount of stock removed, and to correct the adjustment of the stops 155.

I have provided an improved rest for supporting the work between the ends thereof, one of which rests is shown in Figs. 21, 22, and 23. It consists of a casing 167 having a claw 168 (Fig. 21) adapted to enter an undercut channel 169 at one side of the T slot 47, previously mentioned. It also has a detachable clamp 170 with a rounded toe 171 entering a groove in the outer face of the swivel table at the fa e of the longitudinal V rib 28. This clamp is secured by a screw 172. Shoes 173 and 174 are provided for supporting the work, the former bearing against the front side and the latter against the under side. The shoe 173 is secured by a screw 175 to a slide 176 which travels horizontally in the casing and is retained by a cover plate 177 which has a front wall 178 containing a bearing for the adjusting screw 179. The latter is threaded into the slide and projects through the wall 178, having a collar 180 and a knob 181 fastened upon it outside of the wall, and a collar 182 within the wall. The bottom shoe is carried by an arm 183, pivoted to the casing by a pin 184, having a shoulder 185. An intermediate lever 186 bears against the shoulder and is pressed upon by a slide 187 engaged by a similar screw 188 having a knob 189 and an index collar 190.

Fig. 21 shows clearly the manner in which rotation of the screws 179 and 188 may adjust the shoes to any relation with the work. The reason for providing a slide 187 instead of having the screw 188 bearing directly on the lever 186 is that the same direction of rotation of both knobs may have corresponding effects on both shoes. The lever 186 is provided in order to give a more rigid abutment for the arm which carries the shoe 174 than would be provided if the slide 187 were extended far enough to bear directly on the arm 183 and the lever 186 were omitted.

It will be noted that the shoe 173 bears on the work on the side opposite to that engaged by the grinding wheel, whereby the deflection of the work due to pressure of the wheel is overcome, and that the shoe 174 supports the work against deflection due to its weight and to the downward thrust occasioned by the friction of the grinding wheel. There may be as many of these rests as the length and flexibility of the work piece requires, three of them being shown in Figs. 1 and 5, and they may be adjusted to any points where their presence is required.

The formation of the swivel table as above described, with the grooves 169 and 171, is a feature of great importance, as it enables the rests to be applied and removed with the utmost ease without necessitating removal of the work from the centers or shifting of the head stock or the foot stock.

Between the head and foot stocks and the rests, I provide shields to catch the water with which the grinding wheel and work are deluged. One of such shields is illustrated in detail in Figs. 23 and 24. It is made of a sheet or plate 192, preferably of a thickness approximating that of sheet iron, or at any rate relatively very thin, having a cylindrical curvature and provided with a foot or lug 193 adapted to enter the T slot 147 in the swivel table whereby to support and position the sheet. These shields are of standard length and as many of them may be used as may be required to occupy the spaces between the various parts mentioned. Where two or more are required in one space their slight thickness enables them to be overlapped at the edges. Preferably also the casings of the rests have curved ribs 194 (Fig. 23) to underlie the adjacent ends of the shield. These shields prevent the water from spattering beyond the front of the swivel table and conduct the greater part of the water away from the table, for they extend beyond the rear edge thereof as shown in Fig. 23 and discharge the water into a gutter or trough 195 running along the rear side of the slide 13. From this gutter, which has a wide outlet at the rear, the water pours into a pan 196 (Fig. 3) extending over the base at the rear of the slide and having an extension 197 at one end, as shown in Fig. 5. The relatively great length of the outlet from the gutter, which outlet extends between the points *a* and *b*, shown in Fig. 5, and the correspondingly great length of the pan which underlies this outlet at all points in the travel of the slide, allows a rapid and complete discharge of the water from the gutter. An outlet 198 is provided in the pan over a tank 199 at the rear of the base, and in the tank is a pump 200 which forces the water through a pipe 201 to a nozzle 202 (Fig. 3) adjacent to the point of the grinding wheel which engages the work. The same water is thus used over and over again.

Complete provision is made for catching and conducting back any water which may escape past the shields 192 and lodge on the surface of the swivel table 18. Any water escaping in this manner is allowed to flow into the T slot 47 from which two large holes near the ends, or more if desired, extend to the under side of the table 18. One of these holes is indicated by dotted lines at 203 in Fig. 23. In the upper face of the slide 13 beneath the swivel table are several capacious transverse channels 204 shown in Figs. 19 and 23 which lead to the gutter 195. Such of the water as might flow to the extreme ends of the swivel table is caught in pockets 205 formed in detachable end pieces 206 secured to the table as shown in Fig. 25. These pockets discharge into the trough 195. It may be remarked at this point that the pieces 206 carry the index fingers 26 previously mentioned. In this way ample provision is made for conducting all the water back to the tank and preventing any of it escaping outside of the machine. The arrangement of the channels 204 prevents the accumulation of pressure between the slide and table which would cause any water thus accumulated to spurt out at the ends thereof. As the channels are discontinuous and are separated by ribs of the slide which extend entirely to the bottom of the swivel table, the utmost impedance is put in the way of endwise flow of the water while the greatest freedom is given for its flow into the gutter. At the ends of the slide 13 are plates 207 (Figs. 1 and 25) having flanges 208 overlapping lips 209 on the ends of the swivel table, and abutting against lips 210 on the end pieces 206. The abutting flanges 208 and 210 are complementally curved, one being concave and the other convex, about the center of the swivel 19. The flange 208 bears graduation marks 211 with which the finger 26 serves as index.

Figure 2:
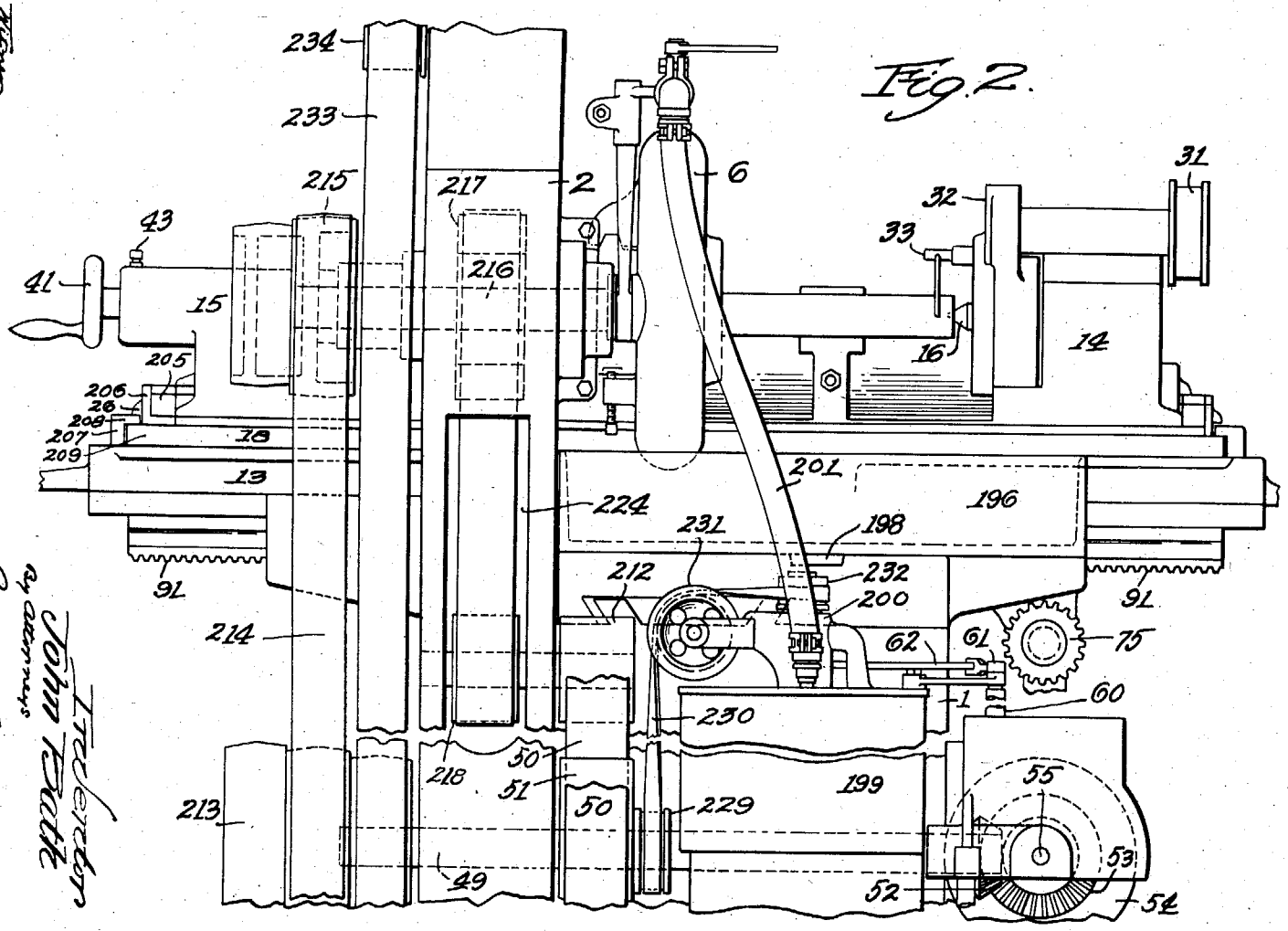
Fig. 2 is a rear elevation of the same.
Figure 3:
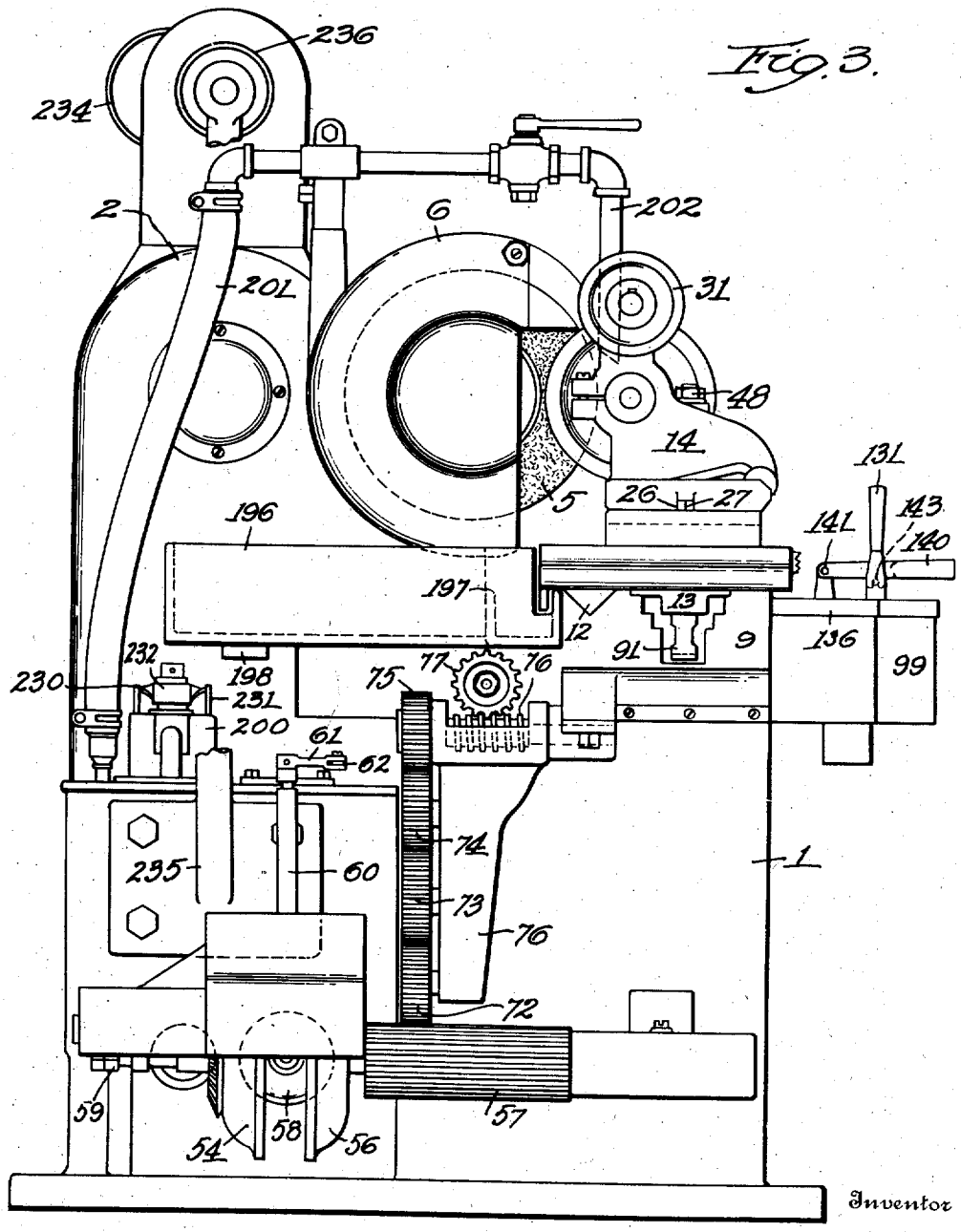
Fig. 3 is an elevation of the left hand end.
Figure 4:
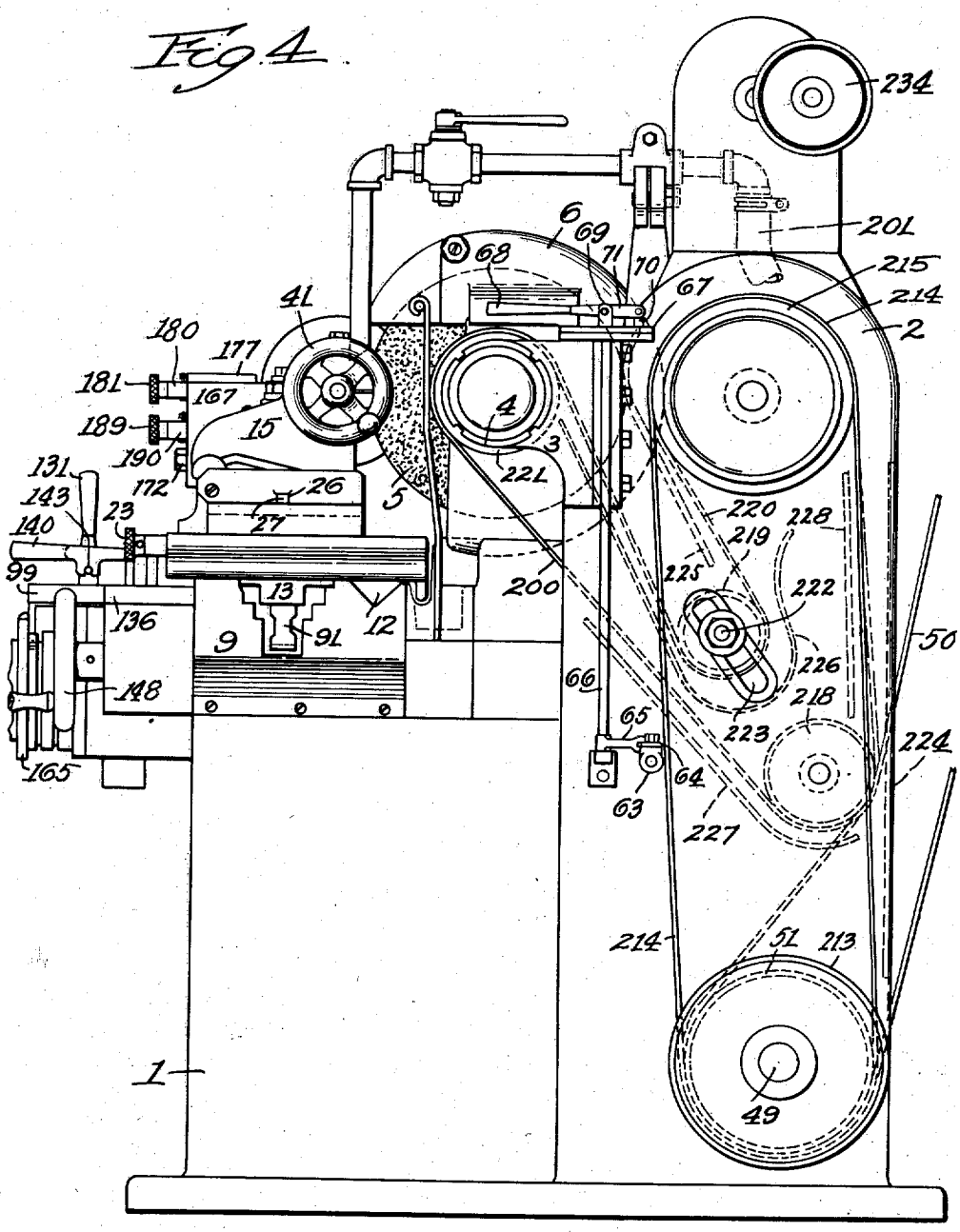
Fig. 4 is an elevation of the right hand end.

I will now describe the means for driving the grinding wheel and work and the special advantages of the particular arrangement of means which I have adopted. I have already mentioned the power belt which comes from a counter-shaft and surrounds the pulley 51 on the drive shaft 49 (Figs. 2 and 4). This belt is guided around an idle pulley 212 which allows it to run from a counter-shaft almost directly over the machine and causes it to surround the greater part of the pulley 51. On the shaft 49 on the opposite side of the L-portion or post 2 of the base from the pulley 51 is a cone pulley 213 from which a belt 214 passes over a complemental cone pulley 215 on the upper part of the L. The latter pulley is fixed to a shaft 216 passing through the L on which is a pulley 217. The latter and two guide pulleys 218 and 219 are all within the L, and around them passes belt 220 which also passes around a pulley 221 secured to the grinding wheel spindle and contained between the bearings on the bracket 3. The upper stretch of the belt 220 passes over the pulleys 217 and 221 and under the pulley 219, while the lower stretch passes under the pulley 218. The pulley 219 is so situated as to make a bight in the upper stretch of the belt and is adjustable in the direction in which this bight extends, being mounted upon a stud 222 adjustably clamped in a guide way 223 in the side of the base. As the base is entirely inclosed except for an opening 224 at the rear and the guide slot 223, I have provided a novel means for placing the belt 220 in the necessary position. This means comprises ribs cast in the base and passing from one side of the L to the other and so arranged as to guide the belt properly around the several pulleys when it is fed in. One of the ribs 225 passes from a point in front of the pulley 217 downward and to the rear of the guide roll 219. The second rib 226 passes from a point above and in the rear of the guide roll, under the same and upward toward the spindle pulley 221, terminating close to the rear side thereof. The third rib 227 lies slightly below and parallel to that stretch of the belt passing from the pulley 221 to the guide roll 218 and is carried around beneath the latter roll. Finally there is a rib 228 directly in front of the rear upwardly running stretch of the belt. It will be seen that in order to place the belt it is only necessary to pass one end through the opening 224 and feed it upwardly, when it will be engaged by the guides in succession and pass properly around the several pulleys and guide rolls until it emerges again through the opening 224.

The arrangement of belting shown contains many valuable features. The main shaft 49 is at a point as near the floor as possible. This has two advantages, namely, that vibrations are absorbed by the floor of the shop rather than by the bed of the machine and so are not allowed to impair the accuracy of the work; and that it enables the longest possible driving belt to be used from an overhead countershaft. It is well known to those skilled in the art that a long belt gives more power than a short one, and this end is secured by the distance of the shaft 49 from the upper countershaft being the greatest possible. Then the disposition of the belt 220 for driving the wheel spindle enables the machine's base to be compact, while at the same time securing great power and enabling the slack to be taken up. This belt surrounds approximately half or more than half of the circumference of both pulleys 217 and 221, whence the tendency to slipping is the minimum. The direction in which the take-up roll 219 is adjustable being approximately parallel to the bight of the belt which surrounds it enables the stretch to be taken up without altering the relation of the belt to these two pulleys.

Beside the pulley 51 on the shaft 49 is a small pulley 229 (Fig. 2) which drives the pump 200 by means of a belt 230. The two stretches of this belt pass around two guide pulleys 231 and are deflected at right angles, passing around a pulley 232 on the pump shaft which lies approximately at right angles to the shaft 49. Also on the shaft 49 and besides the cone pulley 213 is another pulley about which passes a belt 233 running over a pulley 234 on the top of the post 2. Such pulley is connected to a shaft having one bearing in the post and another bearing in a bracket 235 which is fastened at one side of the base 1 and passes to a point above and in the rear of the slide, such bracket being partially shown in Fig. 1. On the shaft is a drum 236 about which is adapted to pass the belt surrounding the driving pulley 31 of the head stock spindle. The drum is shown as broken away in Fig. 1, but it is designed to be of such length as to drive the pulley 31 in all possible positions of the head stock.

It will be observed that the support for the grinding wheel is all on one side of the latter, and also that the dead center projects from the foot stock a distance more than equal to the width of the grinding wheel face. Owing to these features, the slide can be moved to the left far enough to bring the entire length of the work clear of the grinding wheel, and thereby every point on the work is accessible for measurement with calipers. A feature also is that the grinding wheel is mounted close to the side of one of the bearings for the spindle, which bearings are large and massive, and are supported upon a post which is short and of powerful build. This mounting gives great rigidity and capability of absorbing vibrations, and is specially adapted to support a large and broad grinding wheel when the work is fed directly up to it. From the fact that the space at the side of the grinding wheel toward the head stock is entirely open, or in other words, that there are no obstructions which could interfere with the rotation of the face plate and dog on the head stock, it is possible to continue the use of the same grinding wheel until it has been worn down almost or quite to the clamps by which it is secured to the spindle. This I believe to be a condition not found in any other grinding machine.

The supporting bearing surfaces and guide ways for the cross feed carriage 9 on the main portion of the base extend rearward beyond the front of the post or standard 2, adjacent the inward side of said post, and are positioned beneath the grinding wheel and both forward and rearward of the axis thereof. This disposition of the bearing surfaces and guide ways beneath the grinding wheel and both forward and rearward of the axis thereof gives increased stability to the cross-feed carriage and to the work-holding slide mounted thereon, and firmly resists the downward pressure of the wheel on the work.

I have made provision for reproducing with accuracy, work pieces having shoulders, or having lengths of different diameters, so that the distances between the shoulders, or such lengths, will be correspondingly identical on all the pieces. This effect is secured by a templet dog 240 shown in Fig. 14, which is adapted to be mounted upon the slide 13 to perform the functions of the dogs 115 and 116 in co-acting with the lever 97 to effect reversals of the work-carrying slide.

This templet is adapted to be placed upon pins or analogous fastenings 241 (Fig. 1) rising from lugs 242 which project from the front of the slide, and has shoulders 243, any pair of which may embrace the lever 97 and alternately swing the latter back and forth in reciprocation of the slide. One pair of such shoulders control the reciprocations of the slide while a certain part of the work is being done, and when this part is completed the slide is shifted until another pair of shoulders embrace the lever, the templet being temporarily removed from the slide or lifted high enough to clear the lever while the shift is made. It is very apparent that by the use of this templet absolute uniformity in the lengths of the part acted upon in different work pieces may be secured. A different templet dog is naturally used for each particular pattern of work. The manner of mounting the templet on the slide is not of great importance, and may be other than that described, provided only the templet is so mounted that it may be displaced out of the way of the dogs 115 and 116 when it is not used, and may also be so displaced as to permit shifting of the carriage to enable different parts of the templet to be operative.

I claim:

1. A grinding machine including in its construction a cross feed carriage, a work holding slide mounted on said carriage and movable transversely to the feed of the latter, and mechanism for automatically driving said slide, including a gear supported on a stationary part of the machine and having a length as great as the distance of feeding of said carriage, a gear mounted upon the carriage in mesh with and movable longitudinally of said driving gear, and further gearing driven by the second named gear and connected with the work holder.

2. A machine of the character described comprising in combination a grinding wheel, a work-carrier movable across the face of said grinding wheel, a stationary shaft mounted on the base of the machine, a driving disk rotatably mounted on said shaft, means for rotating said disk, a driven disk and a drum connected thereto both rotatably mounted on the shaft, mechanism actuated by said members for reciprocating the work carrier, transmission friction rolls supported by the shaft between said disks in contact therewith, and thrust bearings for said driving elements and said drum, respectively, mounted detachably on the shaft.

3. A grinding machine including a grinding wheel, a work holding bed movable across the face of said wheel, means for reciprocating said bed including oppositely moving elements and a clutch for connecting either of said elements exclusively with the bed, an endwise movable rod for shifting said clutch, a hand lever engaged with said rod for moving the same, and a latch adapted to hold the clutch out of engagement with either driving element.

4. A grinding machine including a grinding wheel, a work holding bed movable across the face of said wheel, means for reciprocating said bed including oppositely moving elements and a clutch for connecting either of said elements exclusively with the bed, an endwise movable rod for shifting said clutch, a hand lever engaged with said rod for moving the same, having a projection on one side, and a latch pivotally mounted adjacent to said hand lever and having a notch adapted to receive said projection, the notch being so located as to admit the projection when the hand lever is an intermediate position, and thereby hold the same and the clutch in neutral condition.

5. A grinding machine including a grinding wheel, a work holding bed movable across the face of said wheel, means for reciprocating said bed including oppositely moving elements and a clutch for connecting either of said elements exclusively with the bed, an endwise movable rod for shifting said clutch, a hand lever engaged with said rod for moving the same, having a projection, a latch member pivotally mounted adjacent to said hand lever and adapted to be placed so as to rest under the force of gravity on the projection, said latch having a notch so arranged as to slip over the said projection, gravity actuated, to arrest the lever and clutch in an intermediate position.

6. A grinding machine including a grinding wheel, a work holding bed movable across the face of said wheel, means for reciprocating said bed including oppositely moving elements and a clutch for connecting either of said elements exclusively with the bed, an endwise movable rod for shifting said clutch, a hand lever engaged with said rod for moving the same, and a latch movably mounted adjacent to said lever adapted to be disengaged therefrom and also to be placed in such position as to automatically lock the same under the influence of gravity when the lever and clutch are in a neutral position.

7. A grinding machine including in its construction a grinding wheel, a work-carrying bed movable across the face of said wheel, mechanism for reciprocating said bed comprising a shaft geared to the bed, oppositely rotating driving elements loose with respect to such shaft, a clutch between said elements non-rotatably engaged with the shaft and movable into connection with either element and simultaneously out of connection with the other, an endwise movable rod connected with said clutch for shifting the latter, collars on said rod, a bracket fixed on a part of the machine having a depending stud, a bell crank lever pivoted on said stud having an arm embracing the rod and contained between said collars, a movable bar engaged with the other arm of said bell crank lever, and means controlled by the travel of said bed shifting the bar back and forth.

8. A grinding machine including in combination a grinding wheel, a work-carrying bed movable across the face of said wheel, reversal driving mechanism for said bed including a reversing clutch and an endwise movable rod for operating said clutch, a lever operated automatically by the movement of the bed for moving said rod, a hand lever for likewise moving the rod, and collars mounted on said rod and embracing those portions of said levers which operate upon the rod, said collars being adjustable so as to permit the respective levers to occupy certain desired relations with one another.

9. A grinding machine including in combination with a grinding wheel and a work-carrying bed movable back and forth across the face of said wheel, driving mechanism including a shifting reversing clutch for moving said bed back and forth, an endwise movable rod coupled to said clutch for shifting the same, a lever engaged with said rod, a bracket fastened to a part of the machine, a stud secured to said bracket and projecting downwardly therefrom, the lever being pivoted to the stud below the bracket, and means for swinging said lever back and forth at the ends of the reciprocation of the bed.

10. A grinding machine including in its construction the combination with a grinding wheel, of a work carrying bed movable back and forth across the face of the work, oppositely rotating drivers, mechanism including a clutch for alternately coupling one of said drivers to the bed and simultaneously cutting the other therefrom, a clutch actuating bar movable by the bed through distances greater than the travel of the clutch, means for coupling the clutch with the bar having provisions for lost motion, means whereby the bed in each direction of travel initiates movement of the bar through an amount equal approximately to such lost motion, and automatic means for continuing the motion of the bar through a farther distance approximately equal to the distance necessary for complete shifting of the clutch.

11. The combination in a grinding machine with a grinding wheel and a work-carrying bed, of mechanism including a shiftable clutch for driving said bed back and forth, a clutch operating bar having a lost motion connection with the clutch and having also a V cam, a yielding actuator engaged with said cam and adapted by pressing on a face of the cam to move the bar, the longitudinal extent of which face of said cam being substantially equal to the amount of the aforesaid lost motion and to the total movement of the clutch, and dogging mechanism operated by the bed for moving said bar at the conclusion of each trip of the bed.

12. A grinding machine comprising a base having a main portion and having a post fixed to the rear part of said main portion of said base and rising above said base at one side of the center thereof, a grinding wheel rotatably carried by said post at the side toward the center of said base and over said main portion thereof, a cross feed carriage supported and guided on the main portion of said base for forward and rearward movement transversely to the axis of the grinding wheel, said carriage being supported on said main portion rearward beyond the front of said post and adjacent the side of said post and beneath said grinding wheel and both forward and rearward of the axis thereof, means to move said carriage forward and rearward on said base, a work-supporting slide mounted to reciprocate on said carriage in front of said post and in a direction substantially parallel to the axis of said wheel, and means to reciprocate said slide.

13. A grinding machine comprising a base, a post rising above said base at one end thereof, a grinding wheel rotatably carried by said post at the inward side thereof, a bed movably mounted on the base, work holders comprising a head stock and a foot stock on the bed, and the head stock being on the opposite side of the grinding wheel from the post, and a work supporting center carried by the foot stock and projecting therefrom a distance greater than the width of the grinding wheel face.

14. In a grinding machine the combination with a grinding wheel of a reciprocable work-carrying bed, dogs mounted upon said bed and a clutch shifter operated by said dogs for effecting reversence of the movement of the bed, a hand operated mechanism for reciprocating the bed, and means for fixing said lever rigidly in a stationary position whereby it may serve in conjunction with said dogs to gage the movements of the bed when the latter is manually reciprocated.

15. In combination with the grinding wheel of a grinding machine and the reciprocating work-carrying bed thereof, a clutch shifting member for effecting reversals of the bed, and a templet dog carried by said bed, said dog having shoulders at a definite distance apart adapted to embrace said clutch-shifting member and move the latter back and forth.

16. In combination with the grinding wheel of a grinding machine and the reciprocating work-carrying bed thereof, a clutch-shifting member for effecting reversals of the bed, and a templet dog having a plurality of pairs of shoulders at predetermined fixed distances apart, any pair of which is adapted to embrace such clutch-shifting member and shift the same back and forth.

17. A grinding machine comprising in combination a grinding wheel, a work-holding carriage movable toward and from the wheel, a rotating feed member for so moving the carriage, a plurality of adjustable fingers carried by said feed member, and a complemental stop for each of said fingers, each said stop being displaceable from the path of its respective finger whereby to permit such finger to pass it without interference.

18. A grinding machine comprising in combination a grinding wheel, a work-holding carriage movable toward and from the wheel, a rotating feed member for so moving the carriage, a set of stop fingers carried by said feed member and each independently adjustable in the direction of movement of said member, a stop for each of said fingers pivotally mounted with provision for independent movement, an abutment for said stop whereby the same is held immovably in the path of the corresponding feed finger, the stop being movable about its pivot out of the path of the corresponding finger.

19. A grinding machine comprising in combination a grinding wheel, a work-holding carriage movable toward and from the wheel, a rotating feed member for so moving the carriage, and a plurality of complemental stop members carried by said feed member and normally stationary, one member of each of such pairs being displaceable independently of the others from the path of the complemental member, a graduated disk carried by the feed member and an index cooperating with said disk.

20. In a machine of the character described having a cross feed carriage, a cross feed screw, and means for turning said screw, stop fingers adjustably mounted upon said screw and each independently adjustable around the same, a stud independent of said feed screw, stops pivoted on said stud each in the path of one of said fingers, and an abutment for said stops to sustain them against the thrust of said fingers, the stops being adapted to swing over and away from said abutment and out of the paths of their respective fingers.

21. In a combination of the character described having a cross feed carriage and a cross feed screw, bearing disks keyed upon said screw, combined stop fingers and clamps surrounding said bearings independently and each having a clamping device for tightening it upon its bearing, and complemental displaceable stops for the several fingers.

22. In a combination of the character described having a cross feed carriage and a cross feed screw bearing disks keyed upon said screw, combined stop fingers and clamps surrounding said bearings independently and each having a clamping device for tightening it upon its bearing, and complemental displaceable stops for the several fingers, a graduated disk fixed to the feed screw and a finger adjacent to the graduation of said disk whereby to regulate the setting of said fingers.

23. In a grinding machine the combination with a longitudinally reciprocating bed having a water trough near one edge, a plate swiveled upon said bed having longitudinal guide ways for a work holder, said guide ways being cut away adjacent to the ends of the plate, and water shields secured to the plate beside the cut away ends of said guide ways and having pockets or channels arranged to discharge into said trough.

24. In a grinding machine the combination with a longitudinally reciprocating bed, of a work-holding plate mounted thereon having a longitudinal slot for securing a work-holder, said bed having a trough at one side of the plate and having transverse channels opening into said trough and extending under the plate, and the plate having passages leading through from said slot, whereby to permit drainage of water entering the slot.

25. In a grinding machine the combination with a reciprocating bed of a work-holding plate mounted upon said bed and a work support on said plate, the bed having a trough at one side of the plate to receive water and having transverse channels extending back from said trough under the plate, said channels being discontinuous, and shields overlapping the ends of the plate, whereby escape of water from the ends of the bed is prevented.

26. A grinding machine comprising in combination a base, a work-carrying bed mounted upon the top of said base, and having means for supporting the work piece, said bed having also a water trough at its rear edge, a pan detachably mounted on the top of the base in rear of said bed having a portion below the outlet of said trough and having also another outlet.

27. A grinding machine comprising in combination a base, a cross feed slide mounted at the top and front side of said base, a longitudinally movable work bed on said slide having a water trough along its rear edge, a water tank at the rear of said base, and a pan detachably mounted on the top of the base having one edge beneath the water trough and extending longitudinally of the bed sufficiently far to underlie the outlet from the trough in all positions of the latter, said pan having an outlet also leading into said tank.

28. In a grinding machine consisting of a base having an upright post at one corner, a grinding wheel supported on said post, a work-carrying bed movably mounted upon the forward portions of the base in front of the grinding wheel, said bed having a water-conducting trough, and a pan detachably mounted on the top of the base beneath and to the rear of the bed and having an extension passing between the bed and the post, for collecting and conducting away water discharged from the trough.

29. In a grinding machine, a box-like stable base having an L-shaped rear extension adjacent to one side thereof, said extension being of box formation and rising above the top of the other part of the base, to constitute a column, the major part of the base being adapted to support a work holding carriage, a grinder wheel holder secured to said column above the base, a grinder wheel spindle mounted in said holder and crossing the forward side of the column, the front wall of the column being open adjacent to said spindle, driving shafts mounted rotatably in said column adjacent to the upper and lower ends thereof respectively, a driving belt operatively engaged with the lower of said shafts, a transmission belt simultaneously engaged with both shafts, a pulley mounted on the upper shaft within the column, a belt passing around said pulley and also around the grinder spindle, and guide pulleys mounted within the column for said belt arranged to cause the belt to surround more than half the circumference of both the pulley and the spindle, and one of said guide pulleys further disposed to guide the belt in a bight extending between the pulley and the spindle with the opposite sides of such bight approximately parallel, the last-named pulley being adjustable in approximately the direction in which such bight extends to take up slack and regulate the tension of said belt.

30. A grinding machine including in its construction a post, a pulley in said post, means for driving the pulley, a grinding wheel spindle pulley supported at the side of the first named pulley, guide pulleys within the post arranged to conduct a driving belt around and between said pulleys, and ribs within the post extending near the several stretches of such belt and arranged to direct a belt around the pulleys in proper order when such belt is fed into the post.

31. In a grinding machine a casing, driving, driven, and guide pulleys in said casing out of regular alinement, and guiding ribs within the casing extending between points near successive pulleys, whereby to guide a belt fed endwise into the casing to and around the pulleys in predetermined order.

32. In a grinding machine in combination with a reciprocating work-carrying bed, a variable speed reversible mechanism for driving said bed, means for actuating the speed varying elements of said mechanism including a rod connected to a clutch mechanism, an upright shaft having an arm linked to said rod, a handle on said shaft for turning the same, a fixed plate through which said shaft extends and a latch element connected with said handle for locking the shaft in various positions in cooperation with said plate.

33. A grinding machine comprising a base having a main portion and having a post fixed to the rear part of said main portion of said base and rising above said base at one side of the center thereof, a grinding wheel rotatably carried by said post at the side toward the center of said base and over said main portion thereof, a cross-feed carriage supported and guided on the main portion of said base for forward and rearward movement transversely to the axis of the grinding wheel, said carriage being supported on said main portion rearward beyond the front of said post and adjacent the side of said post and beneath said grinding wheel and both forward and rearward of the axis thereof, means to move said carriage forward and rearward on said base, a work-supporting slide mounted to reciprocate on said carriage in front of said post and in a direction substantially parallel to the axis of said wheel, and means to reciprocate said slide, said slide having a work-driving head stock mounted thereon at that end of said slide which is on the opposite side of said grinding wheel from said post.

In testimony whereof I have hereunto affixed my signature.

JOHN BATH.